G. E. WARING, Jr.
Traps for Drain, Waste and Sewer Pipes.
No. 204,928. Patented June 18, 1878.
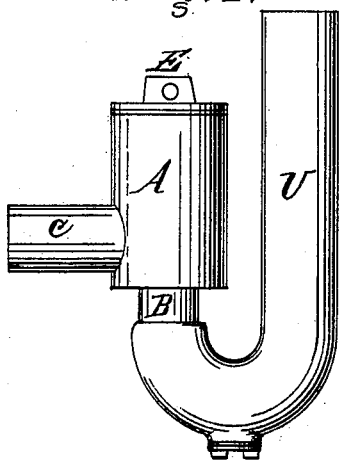
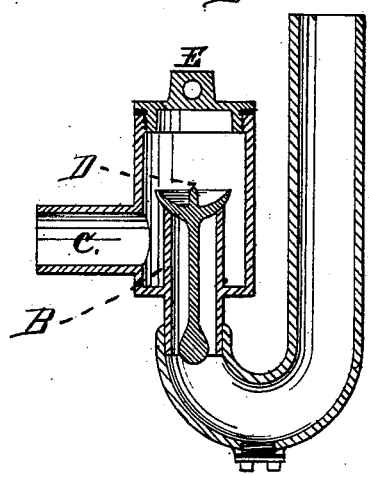 
Witnesses
W. L. Bennem
Phillips Abbott.
Inventor
Geo. E. Waring Jr
by Charles F. Blake
his Atty

UNITED STATES PATENT OFFICE.

GEORGE E. WARING, JR., OF NEWPORT, RHODE ISLAND.

IMPROVEMENT IN TRAPS FOR DRAIN, WASTE, AND SEWER PIPES.

Specification forming part of Letters Patent No. 204,928, dated June 18, 1878; application filed April 15, 1878.

*To all whom it may concern:*

Be it known that I, GEORGE E. WARING, Jr., of the city of Newport, in the State of Rhode Island, have made a new and useful Improvement in Traps for Drain, Waste, and Sewer Pipes, of which the following is such a full, clear, and exact description as will enable others skilled in the art to which it most nearly appertains to make and use the same, when taken in connection with the accompanying drawings, in which—

Figure 1 is a front view of my improved valve-trap. Fig. 2 is a sectional view of the same. Fig. 3 is a detail view of the valve.

The air in rooms in which there are basins, tubs, or similar arrangements connected by pipes with sewers, cess-pools, or drain-pipes is polluted by the entry of gases from the sewers through the connecting-pipes, and great injury thereby done to the health of the occupant. To prevent the entry of these gases it has been common to interpose an S-shaped trap between the opening of the receptacle and the drain-pipe, so arranged that the water contained in the lower part of the bent pipe should cut off the passage of gases from the pipe. It is found that the water in the trap becomes polluted by the absorption of gases on the surface next the sewer, and gives them up on the house or basin side of the trapped water; or, when pressure is brought to bear upon the gases in the pipe, they are forced through the trapped water and escape on the house side; or, when the water is removed from the trap by siphoning or evaporation, a free passage is afforded the gases.

My invention does away with the danger from escaping gas by forming a complete check to the passage of air or gas by absorption or otherwise.

The pipe U is connected with the basin or other vessel or receptacle by one arm, and with the pipe B by the other. The pipe B enters the chamber A through the bottom of the chamber, and extends up within the chamber. On the upper end of the pipe B is formed the valve-seat for the check-valve D, which rests upon it by gravity, and prevents any inflow of air or gas through the pipe C into the pipe B.

The top of the chamber A, into which the inflow and outflow pipes B and C communicate, is formed by a removable head, E, screwed thereon, removable for the adjustment of the valve. The pipe C leads away from the lower part of the chamber, and carries away the water that enters it through the pipe B. The valve-seat is raised in the chamber, so that the water flowing over it has a rapid descent to the outlet-pipe, and carries with it any sediment that may be contained in the water passing through the pipe, and prevents the deposit of impurities on the valve-seat, thus doing away with any liability of the valve to be kept from its seat and passage made for gases. The water entering through one arm of the pipe U rises in the other arm, and enters the chamber A through the pipe B, raising the valve D from its seat for that purpose, and passes off through the pipe C to the drain-pipe.

The pipe U between its two arms forms a water-trap, which, in combination with the check-valve, forms a barrier to the return of any water or gas. The check-valve protects the water of the trap from pollution, and thus prevents any transmission of gas from one surface of the trapped water to the other; and any pressure that may be brought upon the gases in the pipe C by the backing up of the water in the sewer, or by any other cause, will force the valve closer to its seat.

Should the valve become slightly raised from the seat from any cause, the space between it and the seat will permit only a small surface of contact between the water of the trap and the gas in the pipe—too small to cause a pollution of the trapped water, and the water stops the passage of any air from the pipe, and so soon as back-pressure takes place it bears upon the valve and forces it to its seat, closing all communication.

What I claim as new, and desire to secure by Letters Patent of the United States, is—

1. The chamber inlet and outlet pipe so combined that a passage connected with the outlet-pipe is formed between the inlet-pipe and the wall of the chamber, as specified and set forth.

2. The chamber, in combination with the inlet-pipe, provided with a valve-seat and valve raised above the bottom of the chamber, as specified and set forth.

3. The chamber, in combination with the inlet-pipe, provided with a valve-seat and valve raised above the outlet-pipe, as specified and set forth.

4. The chamber, in combination with the inlet-pipe, provided with a valve-seat and valve raised above the bottom of the chamber and above the outlet-pipe, as specified and set forth.

GEO. E. WARING, JR.

Witnesses:
G. G. FRELINGHUYSEN,
BARNES HIGHAM.